Sept. 8, 1936.   R. R. ROCKHILL   2,053,581
DUPLICATOR
Filed Aug. 31, 1934   2 Sheets-Sheet 1
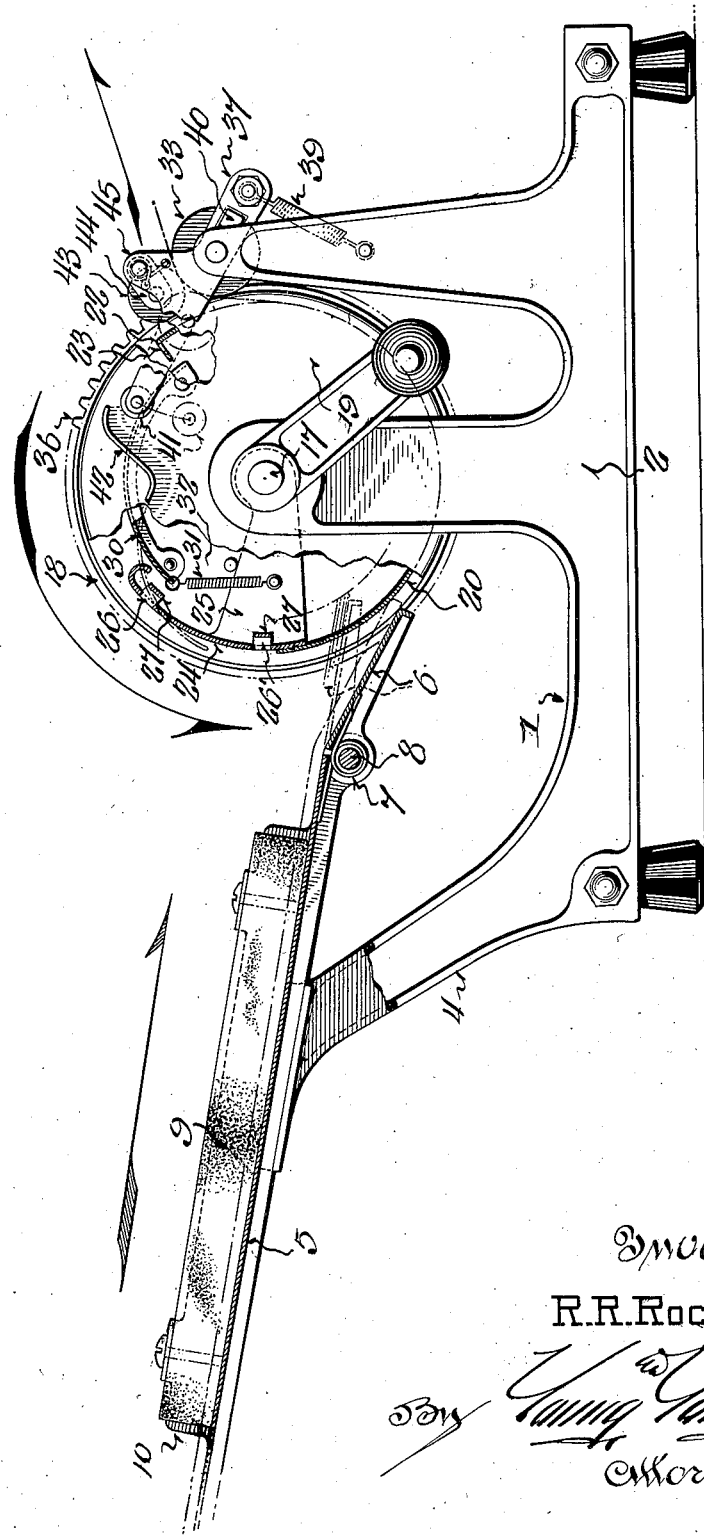
Inventor:
R. R. Rockhill.

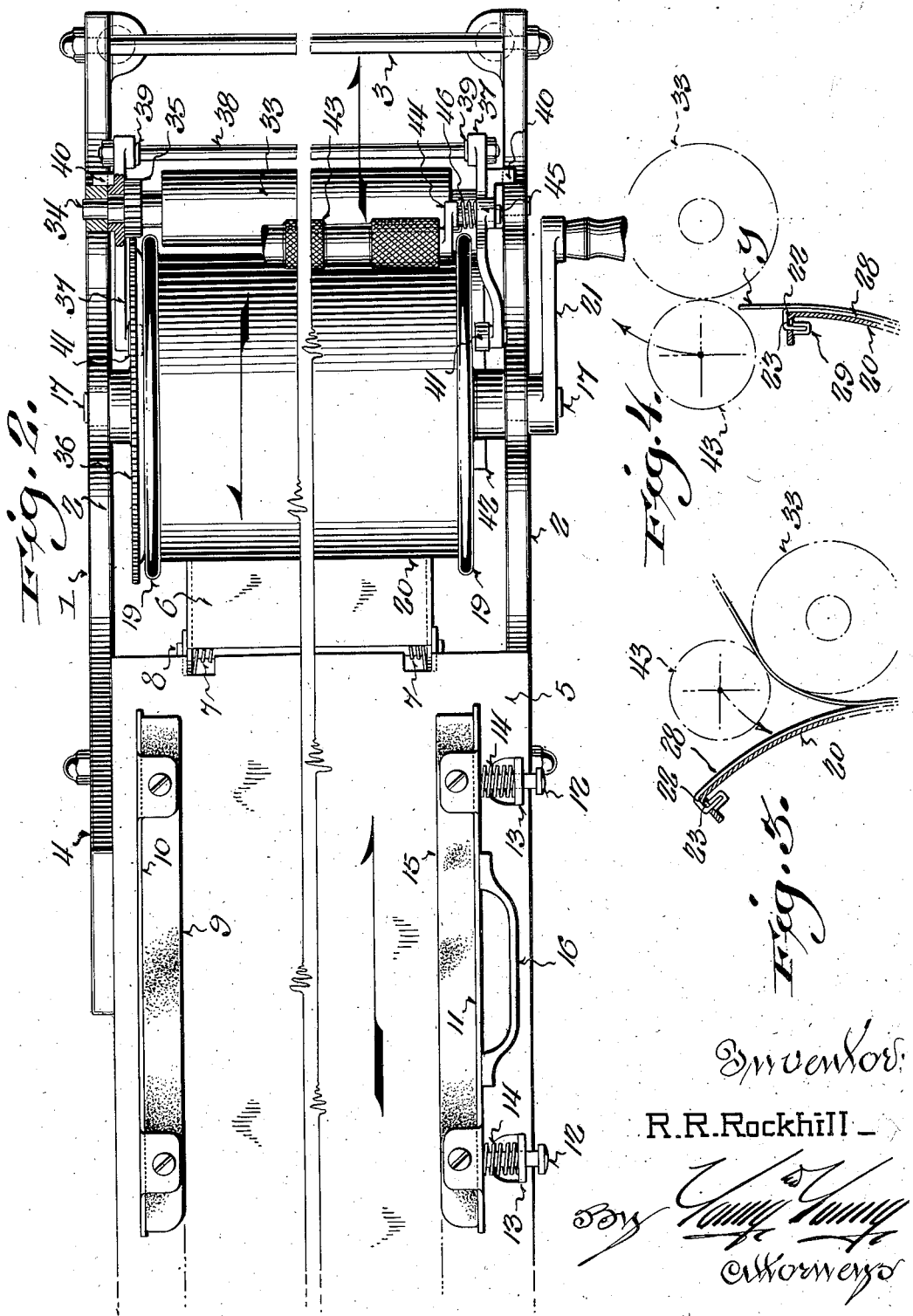

Patented Sept. 8, 1936

2,053,581

UNITED STATES PATENT OFFICE 2,053,581

DUPLICATOR

Roscoe R. Rockhill, Milwaukee, Wis.

Application August 31, 1934, Serial No. 742,279

10 Claims. (Cl. 101—132)

This invention pertains to duplicators, and more particularly to a rotary duplicator of the gelatine type.

The invention has primarily for its object to provide an exceedingly simple, inexpensive, and efficient duplicator, having a minimum number of moving parts, and which automatically feeds itself and can utilize films of different lengths.

Incidental to the foregoing, a more specific object of the invention resides in the provision of unitary means for engaging the ends of the work sheets, and stripping the same from the film in such manner as to require a minimum overhang of the sheet, and thus permit impressions closely adjacent the leading edges of the sheets.

Another important object resides in the provision of means on the cylindrical bed roll for the attachment of films of different lengths, thus effecting a considerable economy in operation when only short copies are to be made.

A further object resides in the novel method of attaching the film, which eliminates weakening perforations and mutilations in the ends of the film.

And, lastly, it is an object to provide an extremely simple and efficient means for automatically feeding the work sheets to the film.

With the above and other objects in view, which will appear as the description proceeds, the invention resides in the novel construction, combination, and arrangement of parts, substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 is an elevation of a machine constructed in accordance with one form of the present invention, parts being broken away and in section to more clearly illustrate the structural details.

Figure 2 is a plan view, with parts broken away and in section, and

Figures 3 and 4 are fragmentary sections through the bed roll, illustrating diagrammatically the manner in which the work sheet is stripped from the gelatine film.

Referring now more particularly to the accompanying drawings, the numeral 1 designates generally a frame comprising side members 2 connected at their ends by transverse cross bars 3. The side frames are provided with rearwardly extending arms 4, upon which an inclined table 5 is supported for reception of a stack of work sheets. Pivotally connected to the forward end of the table 5 is a flap 6, which is urged upwardly by coil springs 7 surrounding the pivotal shaft 8.

In order to frictionally retain a stack of work sheets on the table 5, a strip of sponge rubber, felt, or other pliable material 9 is secured to a vertical flange 10 positioned adjacent one edge of the table. Yieldably mounted upon the opposite edge of the table is a plate 11, which carries the spaced studs 12 passing through the ears 13 struck up out of the table. Coil springs 14 normally urge the plate 11 towards the strip 9, and a pliable strip 15, secured to the plate 11, cooperates with the strip 9 to frictionally hold a stack of sheets upon the table. A handle 16 secured to the plate 11 facilitates manipulation of the same.

A main shaft 17 is journaled in the side members 2, and has secured thereon a cylindrical bed roll 18, comprising the end members 19, to which an annular bed sector 20 is connected. For rotary manipulation of the bed roll a crank handle 21 is secured to one end of the shaft 17.

As best seen in Figure 1, the leading edge 22 of the bed sector 20 is turned inwardly and provided with a transverse slot 23 for reception of the film, as hereinafter described in detail. Adjacent the rear edge of the bed 20, and conforming thereto, is an arcuate plate 24 pivotally connected to the main shaft 17 for oscillatory movement by means of the arms 25. The plate 24, at spaced intervals, is provided with transverse slots 26 and 26′, respectively, which are formed in the present instance by striking out a portion of the material of the plate to provide the spaced transverse straps 27. These slots are for the reception of one end of the gelatine film, which will be later described in detail, while the opposite end of the film 28 is held in the slot 23, as shown in Figures 4 and 5, the ends of the film having a metal bead 29 crimped thereon.

Considering now the means for automatically feeding the work sheets to the film, it will be noted that the interrupted portion of the annular bed sector 20 is closed by an arcuate guide plate 30 secured to the ends 19, and of smaller diameter than the bed, being spaced inwardly of the same. Springs 31, connecting the arms 25 with the guide plate 30, normally urge the arcuate plate 24 to extended position, in which the arms 25 engage the stops 32.

Journaled in the side frames 2, adjacent the forward side of the bed roll 18, is a feed roll 33, formed of rubber or other suitable yieldable material, and secured to the shaft 34 of the feed roll is a gear 35, which meshes with a gear 36, secured to one of the ends 19 of the bed roll, whereby rotation is imparted to the feed roll.

Journaled on shouldered portions of the shaft 34 are the arms 37, the tail ends of which are connected by a transverse brace rod 38, having secured thereto the contractile springs 39 connected with the side members 2, to normally hold the arms in that position illustrated in Figure 1, wherein the stops 40 engage the side members 2. The opposite ends of the arms 37 carry the rollers 41, which are positioned to be engaged by the cam tracks 42 secured to the outer faces of the ends 19, and obviously upon rotation of the bed roll 20, the cam tracks 42, engaging the rollers 41, will rock the arms 37 downwardly against the tension of the springs 39.

Cooperating with the feed roll 33 is an idler roll 43, having an interrupted knurled surface, and being journaled in the crank arms 44, which are journaled in the ears 45, extending upwardly from the arms 37. Coil springs 46, having their ends connected to the cranks 44, and ears 45, serve to normally urge the idler 43 into engagement with the feed roll 33, to effectively grip the work sheet and strip the same from the film 28 during the rotation of the bed roll 20.

Operation

The operation of the present invention may be summarized as follows:—

The film 28 is first secured to the annular bed sector 20 by inserting one of its beaded ends 29 into the slot 23 at the leading edge of the sector. The arcuate plate 24 is then oscillated toward the sector 20, and the bead at the tail end of the film is inserted in one of the slots 26 or 26', depending upon the length of the film, and inasmuch as it is common practise to reproduce copies on work sheets of only letterhead or legal size sheets, provision has been made for accommodating only two lengths of films, corresponding to the respective lengths of the work sheets. After the end of the film is inserted into one of the slots 26 or 26', the arcuate plate is released, and the springs 31 then create the desired tension upon the film to hold the same tightly upon the sector 20.

The table 5 is then loaded with a stack of sheets, the edges of the same being frictionally held between the pads 9 and 15, while their forward ends are positioned against the arcuate guide plate 30, as indicated in dotted lines in Figure 1.

To produce copies of the impression contained upon the film 28, the bed roll is then rotated in the direction, indicated by the arrow in Figure 1, by means of the crank handle 21, causing the leading edge 22 of the bed sector 20 to engage the top sheet of the stack positioned upon the table 5, slightly inwardly of the forward edge of the sheet, to provide a slight overhanging portion ($y$), as best illustrated in Figure 4. As the bed roll is then rotated, the yieldable flap swings downwardly to the position shown in full lines in Figure 1, and through the tension created upon the flap by springs 7, the work sheet picked up by the film is pressed against the bed with sufficient pressure to insure the desired impression being imparted thereto.

With particular reference to Figures 1 and 4, the cam tracks 42 are so shaped and positioned as to engage the rollers 41, causing the arms 22 to be rocked downwardly, swinging the idler 43 over the extended end ($y$) of the work sheet, which causes it to be guided between the idler and the feed roller 33, where it is resiliently gripped and stripped outwardly from the film as the cam tracks 42 release the arms 37. The cycle is then repeated.

From the foregoing explanation, considered in connection with the accompanying drawings, it will be seen that an exceedingly simple, inexpensive, and efficient rotary duplicator has been devised. It is believed that the numerous advantages of the invention are quite apparent, in that the sheets are automatically picked up by the film, thus eliminating the necessity of the complicated and costly mechanical feeding mechanism, such as now employed on certain conventional machines. Also, particular attention is directed to the stripping mechanism. Heretofore, it has been common practice to provide cam-actuating fingers carried by the bed roll for engaging the end of the work sheet, and forcing the same between the stripping rolls. Obviously, the foregoing requires a complicated and costly mechanism, and in addition it is necessary to project the leading edge of the sheet a considerable distance beyond the edge of the film, thus making it impossible to run the impression close to the upper marginal edge of the work sheet and inasmuch as many business forms are arranged for certain indicia closely adjacent the top marginal edge of the sheet, the present conventional duplicators are not suitable, and a change of form is necessitated to accommodate an extended portion of the sheet required for stripping in the usual manner now employed.

Another important feature of the invention results from the provision of means for accommodating films of different lengths. The conventional machines now in use are designed for a maximum length of film, and inasmuch as these are expensive, considerable saving is effected in the present machine, in that shorter films may be utilized for shorter work sheets.

Inasmuch as the work sheets have a tendency to adhere tightly to the gelatine film, particularly under certain conditions of temperature, considerable difficulty is encountered in conventional machines, in effectively stripping the work sheet. However, these difficulties are overcome in the present machine, in that the stripping rolls, which pick up the leading edge of the work sheets, without the aid of fingers, or other feeding mechanism, swing outwardly and away from the bed roll, after the sheet has been gripped, which action results in effectively separating the sheet from the film, due to the fact that it is stripped at a considerable angle to the periphery of the bed roll.

Loading of the machine is comparatively simple, in that the yieldable gripping strip 15 allows the stack of sheets to be placed upon the table 5, without any particular care or skill, and then alines the same for proper registry with the film. The guide plate 30, which is disposed toward the table during the loading operation, insures the proper positioning of the work sheets with relation to the bed sector 20, so that each sheet registers the same.

Heretofore it has been common practice to provide films used on conventional machines, with a series of perforations adjacent their ends for attachment to hooks, or other devices carried by the machine, all of which means that a specially formed film must be employed, which is materially weakened at its ends. These objecttions are eliminated in the present machine, which will accommodate films of any type, in so far as they are provided with some form of bead at their upper and lower edges, for insertion into a slot or opening, whereby the ends are securely held in folded position, as best shown in Figures 3 and 4.

I claim:—

1. A rotary duplicator of the class described comprising, a table, a rotatable bed roll, a stripping roll positioned adjacent the periphery of the bed roll and operatively connected therewith, and a pressure roll engaging the stripping roll and shiftable about the axis of the stripping roll for engaging and guiding sheets to the stripping roll from the bed roll.

2. A rotary duplicator of the class described comprising, a table, a rotatable bed roll, a stripping roll positioned adjacent the periphery of the bed roll and operatively connected therewith, a pressure roll engaging the stripping roll and shiftable about the axis of the stripping roll for engaging and guiding sheets to the stripping roll from the bed roll, and means for automatically shifting the auxiliary roll in predetermined relation to the bed roll.

3. A rotary duplicator of the class described comprising, a table, a rotatable bed roll, a stripping roll positioned adjacent the periphery of the bed roll and operatively connected therewith, a pressure roll engaging the stripping roll and shiftable about the axis of the stripping roll for engaging and guiding sheets to the stripping roll from the bed roll, and means carried by the bed roll for automatically shifting said auxiliary roll in predetermined timed relation with the bed roll.

4. In a rotary duplicator of the class described comprising, a table for receiving a stack of work sheets, a bed roll including an interrupted bed sector, a yieldable flap pivotally connected to one end of the table for engagement with the bed sector to cause sheets to be successively selected from the top of said stack, and a guide plate disposed inwardly from the bed sector at its interrupted portion to aline the sheets on the table with relation to the bed sector.

5. In a rotary duplicator of the class described comprising, a table for the reception of a stack of sheets, yieldable means for frictionally holding the stack on said table, a bed roll including an annular bed sector, a yieldable flap pivotally connected to one end of the table for urging sheets into engagement with said sector, means associated with the sector for the attachment of films of different lengths to the sector, a guide plate disposed inwardly from the periphery of the sector to aline the edges of the work sheets with relation thereto, and unitary means positioned adjacent the bed roll for picking and stripping the work sheets therefrom in timed relation to rotation to the bed roll.

6. A rotary duplicator of the class described comprising a table, a rotatable bed roll, a stripping roll positioned adjacent the periphery of the bed roll and operatively connected therewith, a pressure roll engaging the stripping roll and shiftable about the axis of the stripping roll for engaging and guiding sheets to the stripping roll from the bed roll, and means for automatically and positively shifting the auxiliary roll inwardly of the peripheral arc of the bed roll.

7. A rotary duplicator of the class described comprising a table, a rotatable bed roll, a stripping roll positioned adjacent the periphery of the bed roll and operatively connected therewith, a pressure roll engaging the stripping roll and shiftable about the axis of the stripping roll for engaging and guiding sheets to the stripping roll from the bed roll, and a cam carried by the bed roll for automatically and positively shifting the auxiliary roll inwardly of the peripheral arc of the bed roll.

8. A rotary duplicator of the class described comprising a table, a rotatable bed roll, a stripping roll positioned adjacent the periphery of the bed roll but spaced therefrom and operatively connected therewith, a pressure roll engaging the stripping roll and shiftable about the axis of the stripping roll for engaging and guiding sheets to the stripping roll from the bed roll, and means carried by the bed roll for automatically shifting said auxiliary roll inwardly past the peripheral arc of the bed roll.

9. A rotary duplicator of the class described comprising a table, a rotatable bed roll, a stripping roll positioned adjacent the periphery of the bed roll but spaced therefrom, a gear connection between the bed roll and stripping roll for positively actuating the latter, a pressure roll engaging the stripping roll but shiftable about the axis of the stripping roll for engaging and guiding sheets to the stripping roll from the bed roll, and means carried by the bed roll for automatically shifting said auxiliary roll inwardly past the peripheral arc of the bed roll.

10. A rotary duplicator of the class described comprising a table, a rotatable bed roll, a stripping roll positioned adjacent the periphery of the bed roll and operatively connected therewith, a pressure roll engaging the stripping roll and shiftable to project inwardly of the peripheral arc of the bed roll for engaging and guiding sheets to the stripping roll from the bed roll.

ROSCOE R. ROCKHILL.